Dec. 19, 1961  G. SIMON  3,013,391
FLUID COUPLED DIFFERENTIAL
Filed Aug. 4, 1958  3 Sheets-Sheet 2

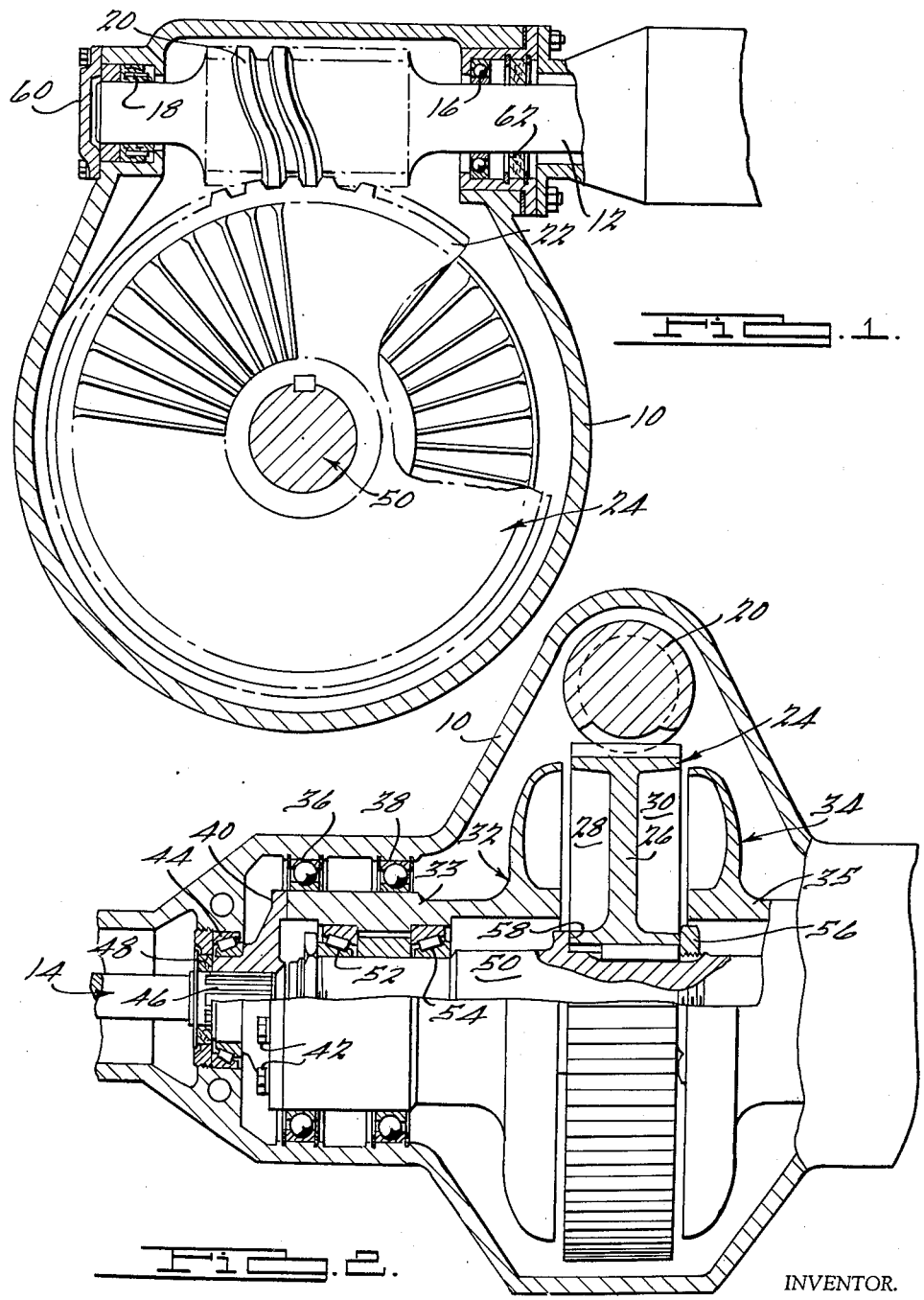

INVENTOR.
George Simon.
BY
Harness, Dickey & Pierce
ATTORNEYS.

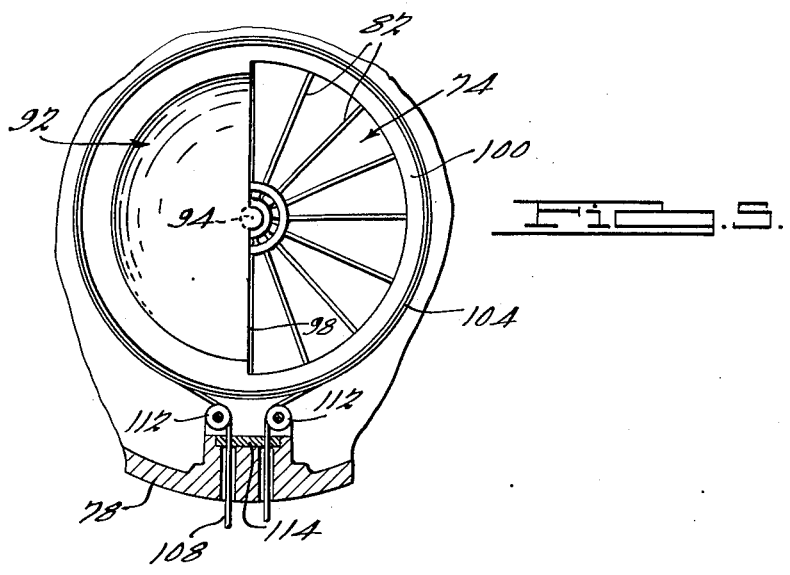
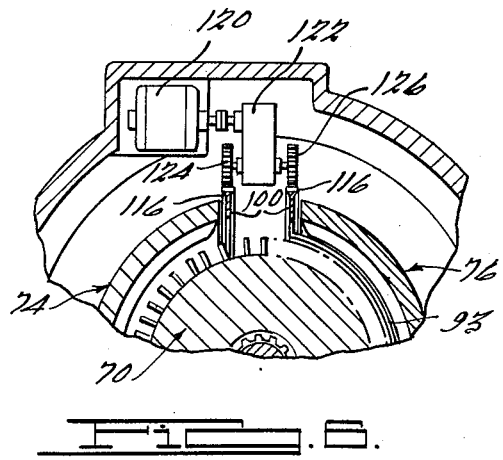

3,013,391
FLUID COUPLED DIFFERENTIAL
George Simon, 274 Lothrop, Grosse Pointe Farms, Mich.
Filed Aug. 4, 1958, Ser. No. 752,849
10 Claims. (Cl. 60—54)

This invention relates to an improved fluid coupled differential power transmitting device such as may be used to transmit mechanical power from a single power source to two points of use as in an automobile rear axle drive.

One important object of the present invention is to provide an improved fluid coupled differential device.

Another object is to provide an improved fluid coupled differential device for transmitting mechanical power from a single source to two separate operative elements which may operate at different speeds.

Another object is to provide a device of this character in which neither one of the driven elements can absorb all of the power from the source, so that even though one of the driven elements becomes unloaded and is permitted to spin freely power is positively transmitted to the other one of the elements to drive it.

Another object is to provide an improved fluid coupled differential for automotive use in which the power is transmitted substantially entirely without the use of gears.

Still another object is to provide an improved fluid coupled differential device for transmitting mechanical power without the use of gears and in which the direction of drive may be reversed merely by changing the position of a baffle within the device.

Another object is to provide an improved fluid coupled differential device including a spherical impeller arranged for rotation about one axis and having radially projecting longitudinally extending vanes, a hemispherical cup-like runner fitted nestingly about the impeller and mounted for rotation about a second axis perpendicular to the one axis, and a baffle disposed between the impeller and the runner and arranged to prevent fluid flow therebetween in a preselected sector.

The foregoing and other objects and advantages of the invention will become apparent in a reading of the following detailed description of representative embodiments thereof taken in conjunction with the drawings, wherein:

FIGURE 1 is a longitudinal sectional view of a fluid coupled differential device according to a first embodiment of the invention;

FIG. 2 is a cross-sectional view of the differential device illustrated in FIG. 1;

FIG. 5 is a fragmentary longitudinal sectional view of the differential shown in FIG. 3 taken generally along the section line 5—5 thereof; and FIG. 6 is a fragmentary horizontal sectional view of a modified form of the embodiment shown in FIGS. 3–5, the view being taken in a generally similar plane to FIG. 3.

Figure 3:
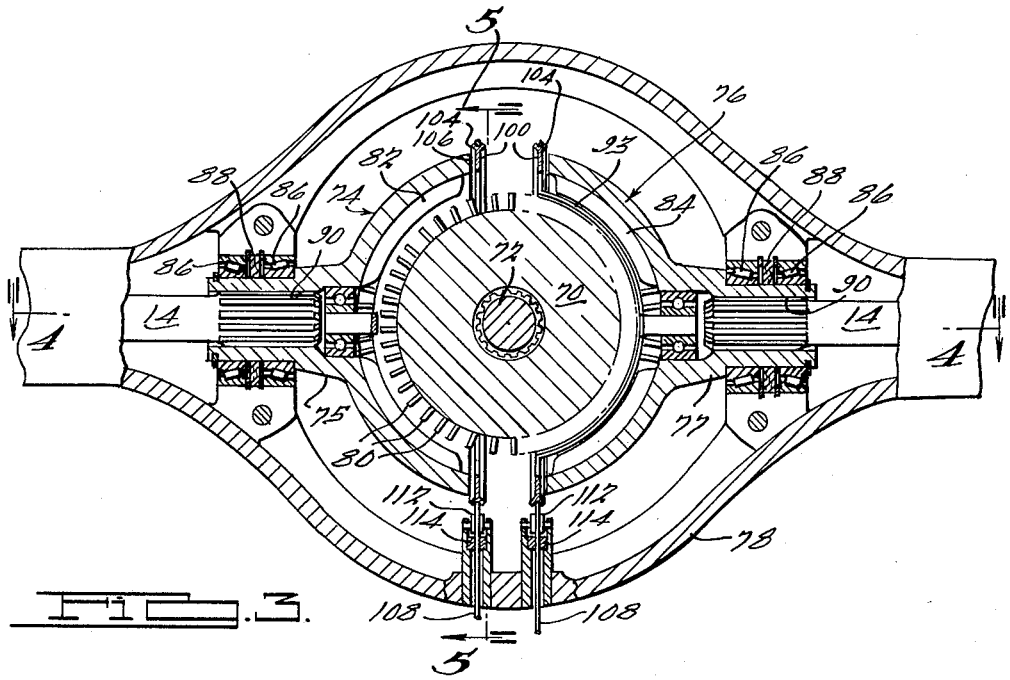
FIG. 3 is a cross-sectional view of a differential device according to a second and preferred embodiment of the invention.

A differential power transmitting device according to a first embodiment of the invention is illustrated in FIGS. 1 and 2, as installed in an automotive vehicle or the like for transmitting power from the propeller shaft 12 of the vehicle to the rear axles 14 (only one of which is shown) which are arranged at right angles to the propeller shaft 12. The device includes a housing 10, which is adapted to be fixed to the vehicle frame. The propeller shaft 12 extends into the housing 10 and is journaled therein upon antifriction bearings 16 and 18 for smooth rotation. A worm 20 is fixed upon the propeller shaft 12 within the housing 10 and between the bearings 16 and 18 for rotation with the shaft. The worm 20 meshes with a worm wheel 22, which is fixed to a rotatably mounted impeller 24. The impeller 24 is of the double faced type, having a central web portion 26 and driving vanes 28 and 30 on opposite respective sides of the web 26, that is, on the left- and the right-hand sides as viewed in FIG. 2.

A first runner 32 is rotatably mounted within the housing 10 closely adjacent to the left-hand side of the impeller 24, and a second runner 34 is rotatably mounted on the opposite side of the impeller 24. The impeller 24 is thus arranged for simultaneously driving both of the runners 32 and 34, the driving force upon the runners being proportional to the speed of the impeller and each one of the runners 32 and 34 being driven substantially independently of the other one. The runners 32 and 34 are connected to opposite ones of the rear axles 14, and thus provide independent driving connections between the two driven wheels of the vehicle and the propeller shaft 12.

The construction is symmetrical left to right as viewed in FIG. 2, so that only one side of the device need be described in detail herein, it being understood that the opposite side is similarly arranged. The runner 32 includes a relatively elongated hub portion 33, which is journaled within a pair of antifriction bearings 36 and 38 for smooth rotation within the housing 10. At its outer end the runner 32 is provided with a cap 40, which is rigidly attached to the runner as by the screws 42, and which is additionally supported upon an antifriction thrust bearing 44. The cap 40 is centrally apertured and internally splined to receive and engage the splined end 46 of the axle shaft 14. An oil seal 48 is provided at the end of the cap 40 for retaining hydraulic fluid within the housing 10.

The impeller 24 is mounted upon a short shaft 50, which is journaled within the hub portions 33 and 35 of the runners, being supported at each end within a pair of antifriction bearings 52 and 54. The impeller 24 is keyed to the shaft 50, and is firmly fixed against axial displacement thereon by a lock nut 56, which is tightened upon a threaded portion of the shaft to wedge the impeller 24 against a shoulder 58 formed on the shaft 50.

The propeller shaft 12 enters the housing 10 generally tangentially to the impeller 24 and is journaled upon the antifriction bearings 16 and 18. An end cap 60 and a rotary oil seal 62 are provided to prevent the escape of hydraulic fluid from the housing around the propeller shaft 12.

It will thus be seen that the device is of sturdy and compact construction. The impeller 24 is rotatably mounted within the two runners 32 and 34, and the housing 10 is adapted to be fixed to the vehicle frame in the conventional manner.

In operation positive driving force is transmitted from the impeller 24 to both of the runners 32 and 34, so that even though one of the vehicle wheels loses traction and can spin freely, driving force will be transmitted independently to the other one of the vehicle wheels and, in fact, substantially all of the engine power will be transmitted to the wheel that retains its tractive engagement with the road surface.

Figure 4:
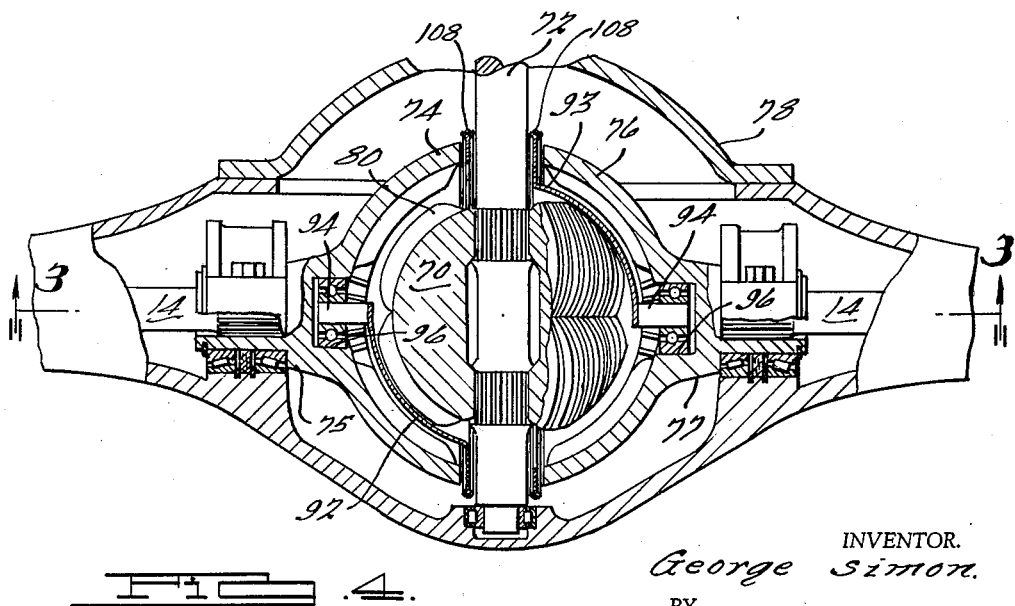
FIG. 4 is a horizontal sectional view of the differential device shown in FIG. 3.

A differential device according to a second, presently preferred embodiment of this invention is illustrated in FIGS. 3–6, and is arranged to provide a right angle drive through a fluid coupling without the use of any gears. In this second embodiment of the invention a spherically-shaped impeller 70 is fixed upon the vehicle propeller shaft 72 as by the spline connection illustrated, and drives a pair of hemispherical runners 74 and 76, which are mounted for rotation about axes perpendicular to the propeller shaft 72. The movable members are sealed within a fluid-tight housing 78 which, as in the previous embodiment, may be fixed to the vehicle frame to provide proper support during operation.

The impeller 70 is generally spherical in shape, and is bored to receive the propeller shaft 72. It is provided with radially projecting hydraulic vanes 80 arranged along lines of longitude and lying in planes which extend through the bore axis of the impeller. The vanes 80 project radially from the impeller surface, and in operation tend to drive hydraulic fluid circumferentially around the propeller shaft 72 in the direction of rotation thereof.

The runners 74 and 76 are generally hemispherical in shape, and fit around the impeller 70 on opposite sides thereof. They are provided with internal vanes 82 and 84, respectively, arranged in a radial pattern as perhaps best seen in FIG. 5. The runners 74 and 76 are supported and rigidly held against translational movement within antifriction bearings 86 and 88, which keep them accurately spaced from the impeller 70. The axle shafts 14 of the vehicle or other load device extend into splined apertures 90 in the hubs 75 and 77 of the runners and are thereby fixed to the runners for rotation therewith.

Now, as perhaps best explained in connection with FIG. 5, rotation of the impeller 70 drives hydraulic fluid in the same direction across the entire face of each one of the runners 74 and 76. Considering only the runner 74 as viewed in FIG. 5, rotation of the impeller 70 in one direction would cause the hydraulic fluid to flow upwardly across the entire face of the impeller and would produce equal and counterbalancing rotational forces on the runner vanes on opposite sides of the runner. In order to transmit rotational power from the impeller 70 to the runner 74, it is necessary to block off the flow of fluid between the impeller and the runner over at least a portion of either the left- or the right-hand side of the runner. This is accomplished by means of a baffle 92 which is interposed between the impeller and the runner. The baffle 92 carries a stub shaft 94 (FIG. 4) by means of which it is rotatably mounted within a cuplike recess 96 within the runner hub 75 for controlled rotational movement within the assembly. A similar baffle 93 is mounted between the impeller 70 and the opposite runner 76.

When the baffle 92 is positioned as shown in FIG. 5, for example, the runner 74 will be rotated in one direction responsively to rotation of the impeller 70 in a given direction. Since in the hypothetical instance the force transmitted by the hydraulic fluid from the impeller 70 to the runner 74 is in an upwardly direction as viewed in FIG. 5, it will be seen that with the baffle arranged on the left-hand side of the runner 74, the runner 74 will be driven in a counterclockwise direction. If now, the baffle 92 is rotated 180° and swung into position on the right-hand side of the runner 74, the force transmitted to the runner 74 (while the impeller 70 continues to rotate in the same direction) will tend to turn the runner in the opposite, or clockwise direction.

Thus the differential transmission according to the preferred embodiment of the invention includes a reversing arrangement for reversing the direction of drive between the impeller 70 and the runners 74 and 76 merely by moving the baffles 92 and 93, and without the use of gears or a gear shifting mechanism. It will be appreciated, of course, that when the baffle 92 is in its mid position, that is, with its edge 98 substantially parallel to the bore axis of the impeller 70, the forces on the runner 74 are substantially balanced and substantially no power is transmitted from the impeller to the runner for rotating it.

Two different arrangements are illustrated for adjusting the positions of the baffles 92 and 93 in the assembly to control the direction of drive between the impeller 70 and the runners 74 and 76. In the arrangement shown in FIGS. 3 to 5, for example, each one of the baffles 92 and 93 is provided with a flat peripherally extending circular flange 100, which projects beyond the outer edges of the runners 74 or 76 and terminates in ring portion 104 shaped to define a radially outwardly facing groove (not separately designated).

Flexible control members 108 are trained around the ring portions 104, being retained within the grooves, and are passed over rotatably mounted guide sheaves 112 (FIG. 5) and brought out of the housing 78 through appropriate seals 114 for manipulation of the baffle from an external control point (not shown).

It will be seen that by pulling upon one end or the other of the control members 108, the baffles 92 and 93 may be readily rotated and adjusted in position as desired. Limit or detent means may be incorporated if desired in the structure to signal the operator when the baffle is in one of any desired number of preselected positions, but such modifications will be well within the skill of those versed in the art, and need not be described in detail herein.

In the alternative arrangement illustrated in FIG. 6, gear wheels 116 are secured to the baffle flanges 100 around their outer edges, and an electric motor 120 is mounted within the housing 10 for driving them through a gear reducer 122 and a pair of synchronously actuatable pinions 124 and 126. In this arrangement it is, of course, not necessary to provide a seal for a movable baffle adjusting member, since none is brought out of the housing 78.

What is claimed is:

1. A fluid coupled right angle drive device comprising a spherically shaped impeller mounted for rotation about a first axis, radially projecting fluid driving vanes fixed upon said impeller and extending therealong in planes of said axis, a hemispherically shaped runner mounted for rotation about a second axis perpendicular to sadi first axis and positioned in nesting relationship to said impeller, said runner having inwardly projecting vanes extending radially from said second axis, and baffle means for blocking fluid flow between said impeller and said runner over a portion of their facing surfaces.

2. A fluid coupled right angle drive device comprising a spherically shaped impeller mounted for rotation about a first axis, radially projecting fluid driving vanes fixed upon said impeller and extending therealong in planes of said axis, a pair of hemispherically shaped runners mounted for rotation at opposite sides of said impeller about a second axis perpendicular to said first axis and positioned in nesting relationship to said impeller, said runners having inwardly projecting vanes extending radially from said second axis, and baffle means for blocking fluid flow between said impeller and said runners over selected portions of their facing surfaces.

3. A fluid coupled right angle drive device comprising a spherically shaped impeller mounted for rotation about a first axis, radially projecting fluid driving vanes fixed upon said impeller and extending therealong in planes of said axis, a pair of hemispherically shaped runners mounted for rotation at opposite sides of said impeller about a second axis perpendicular to said first axis and positioned in nesting relationship to said impeller, said runners having inwardly projecting vanes extending radially from said second axis, baffle means for blocking fluid flow between said impeller and said runners over selected portions of their facing surfaces, and means for adjusting the position of said baffle means.

4. A fluid coupled right angle drive device comprising a spherically shaped impeller mounted for rotation about a first axis, radially projecting fluid driving vanes fixed upon said impeller and extending therealong in planes of said axis, a pair of hemispherically shaped runners mounted for rotation at opposite sides of said impeller about a second axis perpendicular to said first axis and positioned in nesting relationship to said impeller, said runners having inwardly projecting vanes extending radially from said second axis, and a movable baffle positioned between said impeller and said runners for blocking fluid flow between said impeller and said runners over a portion of their facing surfaces.

5. A fluid coupled right angle drive device comprising a spherically shaped impeller mounted for rotation about a first axis, radially projecting fluid driving vanes fixed upon said impeller and extending therealong in planes of said axis, a pair of hemispherically shaped runners mounted for rotation at opposite sides of said impeller about a second axis perpendicular to said first axis and positioned in nesting relationship to said impeller, said runners having inwardly projecting vanes extending radially from said second axis, a movable baffle positioned between said impeller and said runners for blocking fluid flow between said impeller and said runners over a portion of their facing surfaces, and means for controllably moving said baffle.

6. A fluid coupled right angle drive device comprising a spherically shaped impeller mounted for rotation about a first axis, radially projecting fluid driving vanes fixed upon said impeller and extending therealong in planes of said axis, a hemispherically shaped runner mounted for rotation about a second axis perpendicular to said first axis and positioned in nesting relationship to said impeller, said runner having inwardly projecting vanes extending radially from said second axis, a spherically curved baffle for blocking fluid flow between said impeller and said runner over a portion of their facing surfaces, means for mounting said baffle for rotation about said second axis, a circular guide member fixed to said baffle about the peripheral edge thereof, a flexible member trained around said guide member for controllably rotating it thereby to rotate said baffle.

7. A fluid coupled right angle drive device comprising a spherically shaped impeller mounted for rotation about a first axis, radially projecting fluid driving vanes fixed upon said impeller and extending therealong in planes of said axis, a hemispherically shaped runner mounted for rotation about a second axis perpendicular to said first axis and positioned in nesting relationship to said impeller, said runner having inwardly projecting vanes extending radially from said second axis, a spherically curved baffle for blocking fluid flow between said impeller and said runner over a portion of their facing surfaces, means for mounting said baffle for rotation about said second axis, an externally toothed ring gear fixed to said baffle along the periphery thereof, and gear means for driving said ring gear in rotation thereby to control the position of said baffle between said impeller and said runner.

8. A fluid coupled right angle drive device comprising a spherically shaped impeller mounted for rotation about a first axis, radially projecting fluid driving vanes fixed upon said impeller and extending therealong in planes of said axis, a pair of hemispherically shaped runners mounted for rotation at opposite sides of said impeller about a second axis perpendicular to said first axis and positioned in nesting relationship to said impeller, said runners having inwardly projecting vanes extending radially from said second axis, a pair of spherically curved baffles disposed between said impeller and said runners for blocking fluid flow between said impeller and said runners over a portion of their facing surfaces, means for mounting said baffles for rotation about said second axis, and means for controllably rotating said baffles about said axis and for holding said baffles in a preselected position relative to said impeller.

9. A fluid coupled right angle drive device comprising a spherically shaped impeller mounted for rotation about a first axis, radially projecting fluid driving vanes fixed upon said impeller and extending therealong in planes of said axis, a pair of hemispherically shaped runners mounted for rotation at opposite sides of said impeller about a second axis perpendicular to said first axis and positioned in nesting relationship to said impeller, said runners having inwardly projecting vanes extending radially from said second axis, a pair of spherically curved baffles disposed between said impeller and said runners for blocking fluid flow between said impeller and said runners over a portion of their facing surfaces, means for mounting said baffles for rotation about said second axis, and means for controllably rotating said baffles about said second axis synchronously with each other.

10. A fluid coupled right angle drive device comprising a spherically shaped impeller mounted for rotation about a first axis, radially projecting fluid driving vanes fixed upon said impeller and extending therealong in planes of said axis, a hemispherically shaped runner mounted for rotation about a second axis perpendicular to said first axis and positioned in nesting relationship to said impeller, said runner having inwardly projecting vanes extending radially from said second axis, said runner having a central hub portion, journal means carried by said hub portion, a spherically curved baffle for blocking fluid flow between said impeller and said runner over approximately half of their facing surfaces, a shaft fixed centrally along one edge of said baffle and journaled in said journal means whereby said baffle is rotatable about said second axis, and control means for controllably rotating said baffle about said second axis thereby to control the coupling between said impeller and runner and to control the direction of drive therebetween.

References Cited in the file of this patent

UNITED STATES PATENTS

| | | |
|---|---|---|
| 1,175,605 | Cloos | Mar. 14, 1916 |
| 2,464,215 | Copeland | Mar. 15, 1949 |
| 2,465,919 | Novak | Mar. 29, 1949 |
| 2,471,799 | Tombs | May 31, 1949 |
| 2,536,564 | Novak | Jan. 2, 1951 |
| 2,548,873 | Culbertson | Apr. 17, 1951 |
| 2,549,557 | Yancho et al. | Apr. 17, 1951 |
| 2,737,276 | Wyndham | Mar. 6, 1956 |

FOREIGN PATENTS

| | | |
|---|---|---|
| 500,610 | France | Dec. 27, 1919 |